(12) United States Patent
Wu et al.

(10) Patent No.: US 11,385,335 B2
(45) Date of Patent: Jul. 12, 2022

(54) MULTI-THRESHOLD LIDAR DETECTION

(71) Applicant: Beijing Voyager Technology Co., Ltd., Beijing (CN)

(72) Inventors: John K. Wu, Mountain View, CA (US); Lingkai Kong, Mountain View, CA (US); Zhenghan Zhu, Mountain View, CA (US)

(73) Assignee: Beijing Voyager Technology Co., Ltd, Beijing (CN)

( * ) Notice: Subject to any disclaimer, the term of this patent is extended or adjusted under 35 U.S.C. 154(b) by 597 days.

(21) Appl. No.: 16/213,990

(22) Filed: Dec. 7, 2018

(65) Prior Publication Data
US 2020/0182985 A1 Jun. 11, 2020

(51) Int. Cl.
*G01S 7/487* (2006.01)
*G01S 17/14* (2020.01)
*G01S 17/86* (2020.01)
*G01S 17/931* (2020.01)

(52) U.S. Cl.
CPC ............ *G01S 7/4873* (2013.01); *G01S 17/14* (2020.01); *G01S 17/86* (2020.01); *G01S 17/931* (2020.01)

(58) Field of Classification Search
CPC ................................ G01S 7/4873; G01S 7/489
See application file for complete search history.

(56) References Cited

U.S. PATENT DOCUMENTS

| 6,137,566 A * | 10/2000 | Leonard | G01S 17/89 250/206.2 |
| 2005/0213074 A1 | 9/2005 | Hoashi | |
| 2012/0287417 A1 | 11/2012 | Mimeault | |
| 2015/0160340 A1 | 6/2015 | Grauer et al. | |
| 2017/0153319 A1 | 6/2017 | Villeneuve et al. | |
| 2018/0275256 A1 * | 9/2018 | Tosato | G01S 7/487 |
| 2018/0284275 A1 | 10/2018 | LaChapelle | |
| 2019/0178996 A1 * | 6/2019 | Nomura | G01S 7/4865 |
| 2019/0310375 A1 * | 10/2019 | Finkelstein | G01S 7/4868 |

(Continued)

FOREIGN PATENT DOCUMENTS

CN 107748359 A 3/2018

OTHER PUBLICATIONS

International Preliminary Report on Patentability for PCT/US2018/065038 dated Jun. 17, 2021, 7 pages.

(Continued)

*Primary Examiner* — Eric L Bolda
(74) *Attorney, Agent, or Firm* — Kilpatrick Townsend & Stockton LLP

(57) ABSTRACT

A method for operating a LiDAR system in an automobile that can include receiving noise data corresponding to an ambient noise level, receiving false positive data corresponding to a rate of false positive object detection occurrences; determining an object detection range spanning a distance defined by a minimum range of object detection and a maximum range of object detection for the LiDAR system; generating an object detection threshold value for detecting objects based on the noise data and the rate of false positive data; applying the object detection threshold value to each of a plurality of range values within the object detection range; and applying a gain sensitivity profile to the object detection threshold value at each of a plurality of range values.

14 Claims, 9 Drawing Sheets

(56) References Cited

U.S. PATENT DOCUMENTS

2020/0064451 A1* 2/2020 Matsui ................ G01S 7/4863
2021/0156973 A1* 5/2021 Kapusta ............... G01S 7/4873

OTHER PUBLICATIONS

International Search Report for PCT/US2018/065038 dated Mar. 5, 2019, 10 pages.
Robert A. Hewitt et al. "Towards Intensity-Augmented SLAM with LiDAR and ToF Sensors" 2015 IEEE/RSJ International Conference on Intelligent Robots and Systems (IROS), Congress Center Hamburg, Sep. 28-Oct. 2, 2015. Hamburg, Germany, pp. 1956-1961, 6 pages.

* cited by examiner

MULTI-THRESHOLD LIDAR DETECTION

CROSS-REFERENCES TO RELATED APPLICATIONS

The following eight U.S. patent applications listed below (which includes the present application) are being filed concurrently, and the entire disclosures of the other applications are incorporated by reference into this application for all purposes:
  Application Ser. No. 16/213,990, filed Dec. 7, 2018, entitled "MULTI-THRESHOLD LIDAR DETECTION";
  Application Ser. No. 16/213,992, filed Dec. 7, 2018, entitled "MIRROR ASSEMBLY FOR LIGHT STEERING";
  Application Ser. No. 16/214,010, filed Dec. 7, 2018, entitled "COUPLED AND SYNCHRONOUS MIRROR ELEMENTS IN A LIDAR-BASED MICRO-MIRROR ARRAY;
  Application Ser. No. 16/214,013, filed Dec.7, 2018, entitled "COUPLED AND SYNCHRONOUS MIRROR ELEMENTS IN A LIDAR-BASED MICRO-MIRROR ARRAY;
  Application Ser. No. 16/213,995, filed Dec. 7, 2018, entitled "NON-LINEAR SPRINGS TO UNIFY THE DYNAMIC MOTION OF INDIVIDUAL ELEMENTS IN A MICRO-MIRROR ARRAY";
  Application Ser. No. 16/213,997, filed Dec. 7, 2018, entitled "NON-LINEAR SPRINGS TO UNIFY THE DYNAMIC MOTION OF INDIVIDUAL ELEMENTS IN A MICRO-MIRROR ARRAY";
  Application Ser. No. 16/213,999, filed Dec. 7, 2018, entitled "A LEVER SYSTEM FOR DRIVING MIRRORS OF A LIDAR TRANSMITTER"; and
  Application Ser. No. 16/214,001, filed Dec. 7, 2018, entitled "SYSTEM AND METHODS FOR CONTROLLING MICRO-MIRROR ARRAY".

BACKGROUND

Modern vehicles are often fitted with a suite of environment detection sensors that are designed to detect objects and landscape features around the vehicle in real-time that can be used as a foundation for many present and emerging technologies such as lane change assistance, collision avoidance, and autonomous driving capabilities. Some commonly used sensing systems include optical sensors (e.g., infra-red, cameras, etc.), radio detection and ranging (RADAR) for detecting presence, direction, distance, and speeds of other vehicles or objects, magnetometers (e.g., passive sensing of large ferrous objects, such as trucks, cars, or rail cars), and light detection and ranging (LiDAR).

LiDAR typically uses a pulsed light source and detection system to estimate distances to environmental features (e.g., vehicles, structures, etc.). In some systems, a laser or burst of light (pulse) is emitted and focused through a lens assembly and a reflection of the pulse off of an object is collected by a receiver. A time-of-flight (TOF) of the pulse can be measured from the time of emission to the time the reflection is received, which may manifest as a single data point. This process can be repeated very rapidly over any desired range (typically 360 degrees over a 2D plane for ground-based vehicles, and a 3D region for aircraft) to form a collection of points that are dynamically and continuously updated in real-time, forming a "point cloud." The point cloud data can be used to estimate, for example, a distance, dimension, and location of the object relative to the LiDAR system, often with very high fidelity (e.g., within 5 cm).

Despite the promise that LiDAR and other sensing systems bring to the continued development of fully autonomous transportation, there are challenges that limit its widespread adoption. LiDAR systems are often expensive, large, and bulky. In some cases, multiple emitters may be needed to accurate track a scene, particularly for systems that require accuracy over a large range and field-of-view (FOV). While significant strides have been made to push autonomous vehicle technology to greater commercial adoption, more improvements are needed.

BRIEF SUMMARY

In some embodiments, a method for operating a light detection and ranging (LiDAR) system in an automobile can include receiving noise data corresponding to an ambient noise level; receiving false positive data corresponding to a rate of false positive object detection occurrences for the LiDAR system; determining an object detection range spanning a distance defined by a minimum range of object detection and a maximum range of object detection for the LiDAR system; generating an object detection threshold value for detecting objects based on the noise data and the rate of false positive data, the object detection threshold value defining a signal amplitude minimum value for any received LiDAR return signal that causes the LiDAR system to determine that an object is detected; applying the object detection threshold value to each of a plurality of range values within the object detection range; and applying a gain sensitivity profile to the object detection threshold value at each of a plurality of range values, wherein the gain applied to the object detection threshold decreases from a maximum gain value at the minimum range of object detection to a minimum gain value at the maximum range of object detection. In some cases, the method can further include sending a first LiDAR send signal in a predetermined direction; receiving a first LiDAR return signal from the predetermined direction, the first LiDAR return signal being a reflection of the first LiDAR send signal that has been reflected by an object; determining a time-of-flight (TOF) measurement corresponding to a difference between a time that the first LiDAR send signal was sent and the first LiDAR return signal was received; determining a first range value based on the TOF measurement, the first range value defining a distance of the object from the vehicle; determining an amplitude for the first LiDAR return signal; determining that an object is detected when: the first range value is within the object detection range; and the amplitude for the first LiDAR return signal is at or above an object detection threshold value applied to the first range value, the object detection threshold value at the first range value being modified by the gain sensitivity profile. In some embodiments, the method includes detecting the ambient noise level adjacent to the LiDAR system with a microphone, the microphone configured to provide the noise data received by the LiDAR system.

In certain embodiments, the method may further include determining that an object is not detected when: the first range value is not within the object detection range; or the amplitude for the first LiDAR return signal is not at or above the object detection threshold value applied to the first range value. The gain sensitivity profile may be based on a Lambertian model, or other suitable model not limited to the following: Oren-Nayar, Nanrahan-Krueger, Cook-Torrence, Diffuse BRDF, Limmel-Seeliger, Phong, Blinn-Phong, Ward, HTSG, Fitted Lafortune, or the like. In some cases, the minimum gain value may be 1, and the gain value may change in an inversely proportional manner with respect to a magnitude of the object range value. In further embodiments, the method can further include starting a counter for a receive window when the first LiDAR send signal is sent; and stopping the counter for the receive window then the first LiDAR return signal is received, where the difference between the time that the first LiDAR send signal is sent and the first LiDAR return signal is received corresponds to a difference between a time when the counter is started and stopped.

In certain embodiments, a LiDAR system for a vehicle can include one or more processors; and one or more non-transitory computer-readable storage mediums containing instructions configured to cause the one or more processors to perform operations including: receiving noise data corresponding to an ambient noise level; receiving false positive data corresponding to a rate of false positive object detection occurrences for the LiDAR system; determining an object detection range spanning a distance defined by a minimum range of object detection and a maximum range of object detection for the LiDAR system; generating an object detection threshold value for detecting objects based on the noise data and the rate of false positive data, the object detection threshold value defining a signal amplitude minimum value for any received LiDAR return signal that causes the LiDAR system to determine that an object is detected; applying the object detection threshold value to each of a plurality of range values within the object detection range; and applying a gain sensitivity profile to the object detection threshold value at each of a plurality of range values, where the gain applied to the object detection threshold decreases from a maximum gain value at the minimum range of object detection to a minimum gain value at the maximum range of object detection.

The one or more non-transitory computer-readable storage mediums of the LiDAR system may contain further instructions configured to cause the one or more processors to perform operations including: sending a first LiDAR send signal in a predetermined direction; receiving a first LiDAR return signal from the predetermined direction, the first LiDAR return signal being a reflection of the first LiDAR send signal that has been reflected by an object; determining a time-of-flight (TOF) measurement corresponding to a difference between a time that the first LiDAR send signal was sent and the first LiDAR return signal was received; determining a first range value based on the TOF measurement, the first range value defining a distance of the object from the vehicle; determining an amplitude for the first LiDAR return signal; determining that an object is detected when: the first range value is within the object detection range; and the amplitude for the first LiDAR return signal is at or above an object detection threshold value applied to the first range value, the object detection threshold value at the first range value being modified by the gain sensitivity profile. In some implementations, the one or more non-transitory computer-readable storage mediums can contain further instructions configured to cause the one or more processors to perform operations including: determining that an object is not detected when: the first range value is not within the object detection range; or the amplitude for the first LiDAR return signal is not at or above the object detection threshold value applied to the first range value. The gain sensitivity profile can be based on a Lambertian model or other suitable model, as further described below. In some cases, the minimum gain value may be 1, and wherein the gain value changes in an inversely proportional manner with respect to a magnitude of the object range value.

In some embodiments, the one or more non-transitory computer-readable storage mediums may contain further instructions configured to cause the one or more processors to perform operations including: starting a counter for a receive window when the first LiDAR send signal is sent; and stopping the counter for the receive window then the first LiDAR return signal is received, wherein the difference between the time that the first LiDAR send signal is sent and the first LiDAR return signal is received corresponds to a difference between a time when the counter is started and stopped. In some cases, the one or more non-transitory computer-readable storage mediums may contain further instructions configured to cause the one or more processors to perform operations including: detecting the ambient noise level adjacent to the vehicle with a microphone, the microphone configured to provide the noise data received by the LiDAR system.

In certain embodiments, a LiDAR system can include one or more processors; a transmitter controlled by the one or more processors, the transmitter configured to generate a pulsed beam of light having M pulses; a first receiver controlled by the one or more processors, the first receiver configured to detect and store return pulses that comprise portions of the pulsed beam of light that has been reflected off of one or more objects; a second receiver controlled by the one or more processors, the second receiver configured to detect and store the return pulses; an Nth receiver controlled by the one or more processors, the Nth receiver configured to detect and store the return pulses, where each of the receivers are assigned an object detection threshold value defining a signal amplitude minimum value for the detected and stored return pulses that causes the LiDAR system to determine that an object is detected, and where the object detection threshold value for each of the receivers is modified by a gain sensitivity profile configured to amplify the object detection threshold value based on a detected TOF of the detected and stored return pulses; and an arbitration logic module controlled by the one or more processors, the arbitration logic module configured to: consecutively retrieve the stored return pulses from the receivers that meet or exceed their corresponding object detection threshold value starting with the first receiver through the Nth receiver until the number of retrieved return pulses equals M or more pulses; and validate the retrieved M return pulses as detected objects.

In some implementations, the object detection threshold value can be determined based on an ambient noise level adjacent to the vehicle and a rate of false positive object detection occurrences for the LiDAR system. A magnitude of amplification provided by the gain sensitivity profile for each receiver may be inversely proportional to a magnitude of the corresponding detected TOF of the detected and stored return pulses, according to some embodiments. The gain sensitivity profile ,ay corresponds to a Lambertian model or other suitable model, as further described below. In some cases, the stored return pulses are pulses that were stored within a receive window, can be approximately equal to a TOF for a return signal at a maximum range of detection for the LiDAR system.

BRIEF DESCRIPTION OF THE DRAWINGS

The detailed description is set forth with reference to the accompanying figures.

DETAILED DESCRIPTION

Aspects of the present disclosure relate generally to object and environment detection systems, and more particularly to LiDAR systems, according to certain embodiments.

In the following description, various examples of LiDAR-based systems using various multi-threshold detection schemes are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Figure 1:
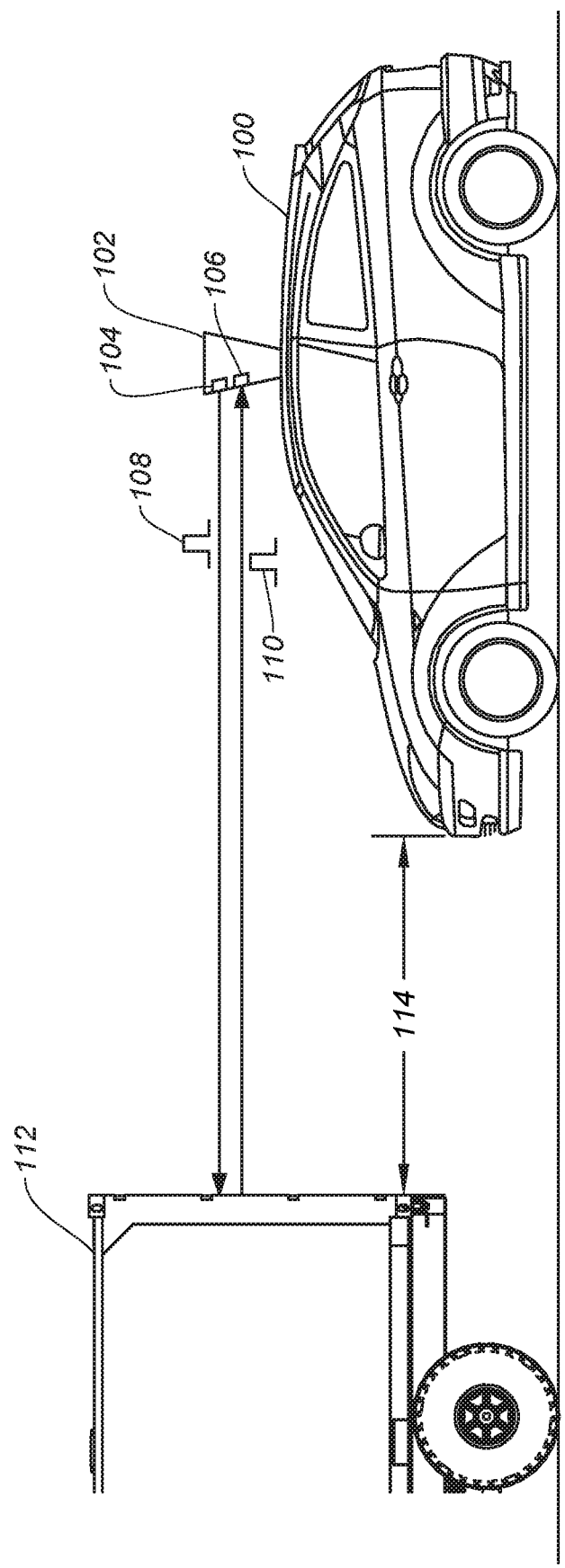
FIG. 1 shows a vehicle utilizing a LiDAR-based detection system, according to certain embodiments.

To following high level summary is intended to provide a basic understanding of some of the novel innovations depicted in the figures and presented in the corresponding descriptions provided below. Aspects of the invention relate to an improved mobile LiDAR-based multi-threshold detection system, which may be mounted on a vehicle (e.g., automobile, unmanned aerial vehicle, etc.), as shown in FIG. 1. The LiDAR system (see, e.g., FIG. 2) may use a pulsed light source (e.g., focused light, lasers, etc.) and detection system to detect external objects and environmental features (e.g., vehicles, structures, etc.), determine the vehicle's position, speed, and direction relative to the detected external objects, and in some cases may be used to determine a probability of collision, avoidance strategies, or otherwise facilitate certain remedial actions, as further described below.

One of the problems that aspects of the present invention solves is the challenge of detecting objects over a large range (e.g., 200-500 m) with high fidelity (e.g., within 5 cm or less) using a limited number of receivers. For example, a detected pulse may be relatively easy to detect at close range (e.g., 20 m) as the raw signal with respect to the ambient noise level (i.e., the signal-to-noise ratio (SNR) may be high. Return signal strength can depend on multiple factors including, but not limited to, the emitting signal strength, object reflectivity, system front end gain, etc. The noise floor can be dependent on the ambient light level and front end gain settings. Generally, in the same system an SNR decay can be approximated as shown in Equation 1 below, where d is the distance of detection. For example, the SNR at 30 m may be ⅑$^{th}$ of the SNR at 10 m.

$$SNR \text{ Decay} \cong \frac{1}{d^\wedge 2} \quad \text{(Equation 1)}$$

As such, signals reflected at far ranges (e.g., 200 m) may be significantly weaker and close in amplitude with respect to the ambient noise level (low SNR). Setting a detection threshold too high may not register signals that are reflected at far range. Conversely, setting the detection threshold too low may result in false positive detections where spurious noise may trigger an object detection where none is present. Aspects of the invention solve this problem in different ways. For instance, some systems include a LiDAR detection scheme having a dynamic range dependent threshold that can reduce the impact of false alarms at close (e.g., 20 m) to mid-range (e.g., 80 m), without having to sacrifice detection sensitivity at far ranges (see, e.g., FIGS. 3 and 5-6). In such embodiments, an object detection threshold (e.g., determined based on an ambient noise level and/or a false positive rate of detection) can be applied over a detection range and modified by a gain sensitivity profile (e.g., using a Lambertian model). The result can be a distance (range) dependent threshold that may have a low (e.g., unity) amplification at the farthest limits of detection where signal amplitudes may be close to the noise floor (low SNR with a greater likelihood of a false positive from noise spikes) and an increasing threshold due to the progressively greater amplification for closer ranges of detection (due to the comparatively high signal amplitude thresholds far above the noise floor), which may result in a much improved reliability of detection for close to mid-range objects. The outcome can yield a single receiver system with a variable object detection threshold that appropriately adapts to the expected amplitude of the received signal for a much improved reliability and accuracy over conventional LiDAR-based systems.

Figure 7:
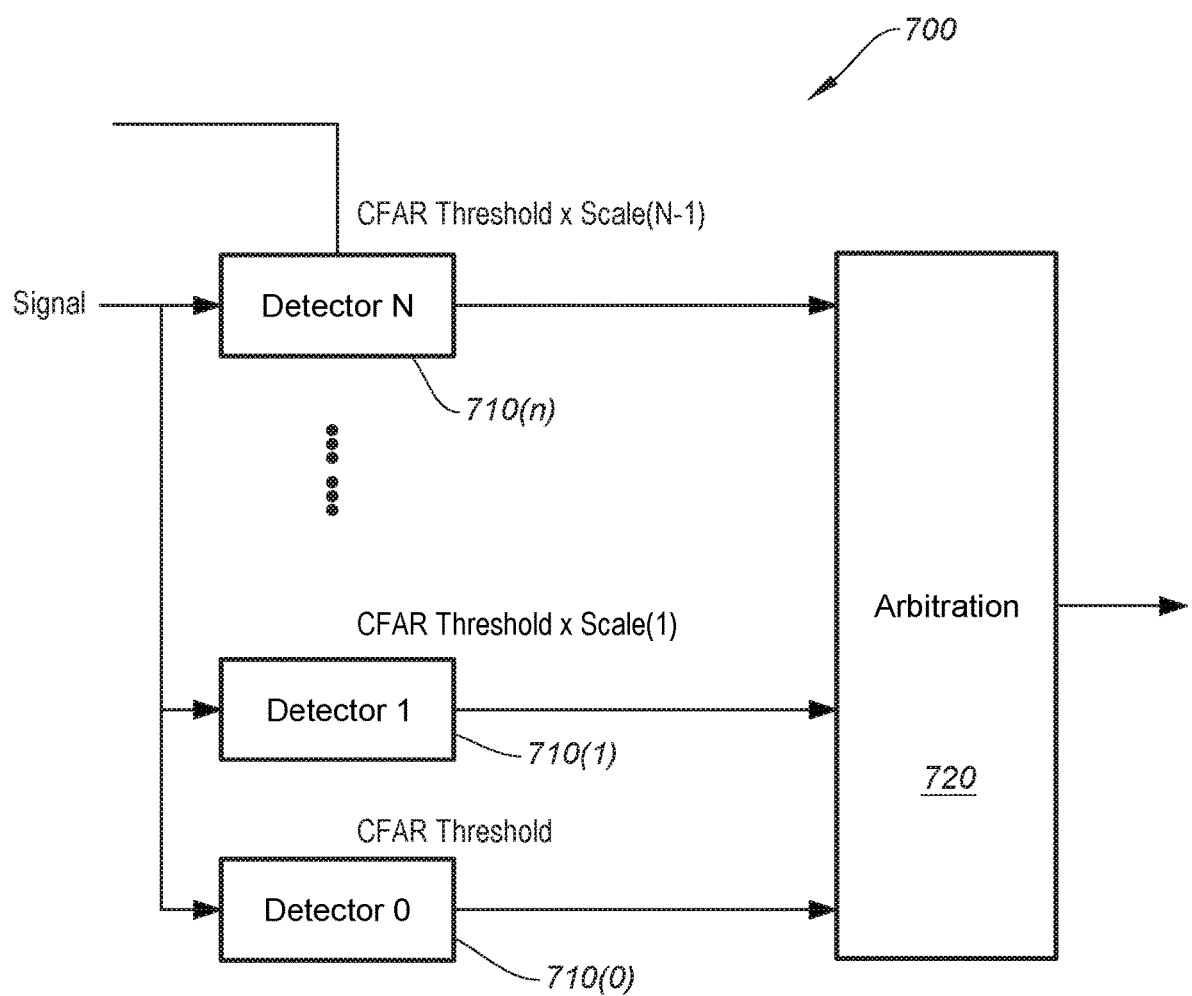
FIG. 7 shows a LiDAR system receiver module with parallel detectors, according to certain embodiments.
Figure 8:
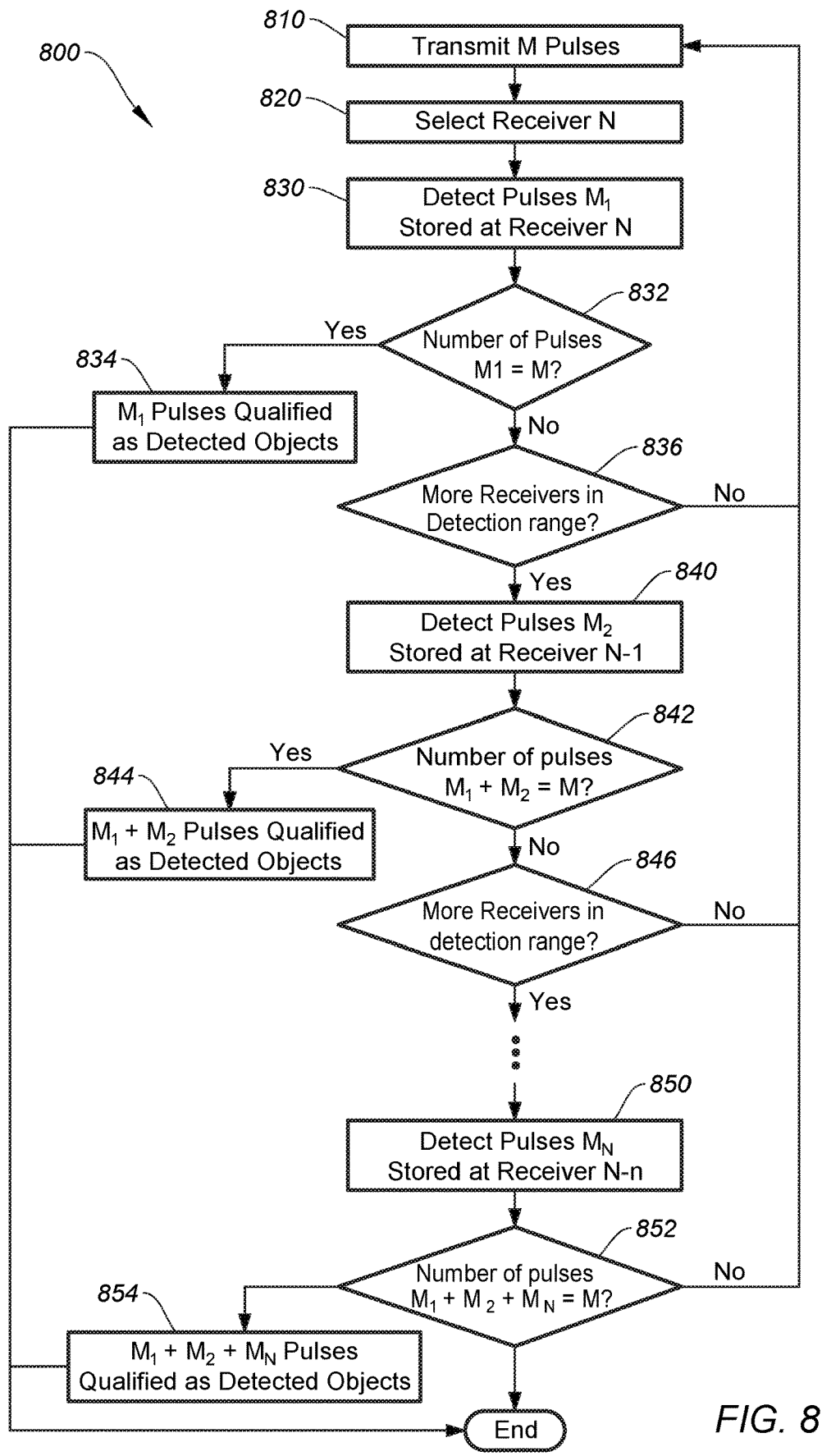
FIG. 8 shows a simplified flow chart showing a method for detecting one or more objects in a multi-receiver LiDAR-based system using an arbitration logic, according to certain embodiments.

In further embodiments, a LiDAR system using parallel detectors with different operating thresholds and a corresponding arbitration logic to improve accuracy can be used (see, e.g., FIGS. 7-8). In some cases, an object detection threshold may be determined in a similar manner as described above, and the range dependent gain adjustment may be applied for each parallel received based on their corresponding ranges of detection. An arbitration logic operated by the LiDAR system (and/or other local or remote computational resource) may systematically cycle through received signals starting with the receiver calibrated for close object detection and progressing through receivers calibrated for farther distances until an expected number of return pulses are received, as further described below. This LiDAR architecture and arbitration process can result in a much improved detection system having exceptional accuracy and reliability in the field. These embodiments and more are further described below. It should be noted that the aforementioned examples and descriptions above are not all inclusive. Further, any of the embodiments described with this disclosure may be combined with other embodiments in any suitable fashion, as would be appreciated by one of ordinary skill in the art with the benefit of this disclosure.

Typical System Environment for Certain Embodiments

FIG. 1 shows a vehicle 100 utilizing a LiDAR-based detection system, according to certain embodiments. Vehicle 100 can include a LiDAR module 102. LiDAR module 102 can allow vehicle 100 to perform object detection and ranging in a surrounding environment. Based on the result of object detection and ranging, vehicle 100 can, for example, maneuver to avoid a collision with the object. LiDAR module 102 can include an emitter module 104 and a receiver 106. Emitter module 104 can be configured to project one or more light pulses 108 at various directions at different times in any suitable scanning pattern, while receiver 106 can monitor for a return light pulse 110 which is generated by the reflection of light pulse 108 by an object. LiDAR module 102 can detect the object based on the reception of light pulse 110, and can perform a ranging determination (e.g., a distance of the object) based on a time difference between light pulses 108 and 110, which may be referred to as a time-of-flight. As indicated above, this operation can be repeated very rapidly over any desired range. In some cases, scanning (e.g., pulse emission and detection) may be performed over 360 degrees over a two-dimensional (2D) plane for ground-based vehicles (as vehicle detection systems may be primarily concerned with objects and environmental features on the ground), or over a three dimensional (3D) volumetric area for aircraft.

In some embodiments, a spinning mirror system (e.g., LiDAR module 102) may be used that can allow a single laser to aim over 360 degrees at a high rate of rotation (e.g., 500-5000 RPMs or more) over a single plane to form a collection of points (e.g., each point being an individual measurement such as one sent and reflected pulse) that are dynamically and continuously updated in real-time, forming a "point cloud." The point cloud data can be used to estimate, for example, a distance, dimension, and location of the object relative to the LiDAR system, often with a very high fidelity (e.g., within 2 cm). In some cases, a third dimension (e.g., height) may be performed in a number of different manners. For example, the spinning mirror system (or other suitable apparatus) can be moved up and down (e.g., on a gimbal or other actuating device) to increase the field of view (FOV) of the scan. Although not shown or discussed further, it should be understood that other LiDAR systems may be used to develop a point cloud and may incorporate the novel aspects of the various threshold-adjusted detection schemes described herein. For example, some scanning implementations may employ solid state, flash-based LiDAR units that can be configured to scan a 2D focal plane area. One of ordinary skill in the art with the benefit of this disclosure would appreciate the many alternative embodiments and modifications thereof.

Referring back to FIG. 1, LiDAR module 102 can transmit light pulse 110 (send signal) at a direction directly in front of vehicle 100 at time T1 and receive light pulse 110 (return signal) reflected by an object 112 (e.g., another vehicle) at time T2. Based on the reception of light pulse 110, LiDAR module 102 can determine that object 112 is directly in front of vehicle 100. Moreover, based on the time difference between T1 and T2, LiDAR module 102 can also determine a distance 114 between vehicle 100 and object 112, and may glean other useful information with additional received pulses including a relative speed and/or acceleration between the vehicles and/or dimensions of the vehicle or object (e.g., the width of the object in 2D, or a height and width (or portion thereof depending on the FOV) with 3D detection. Thus, vehicle 100 can adjust its speed (e.g., slowing or stopping) to avoid collision with object 112, or modulate systems such as adaptive cruise control, emergency brake assist, anti-lock braking systems, or the like, based on the detection and ranging of object 112 by LiDAR module 102.

Figure 2:
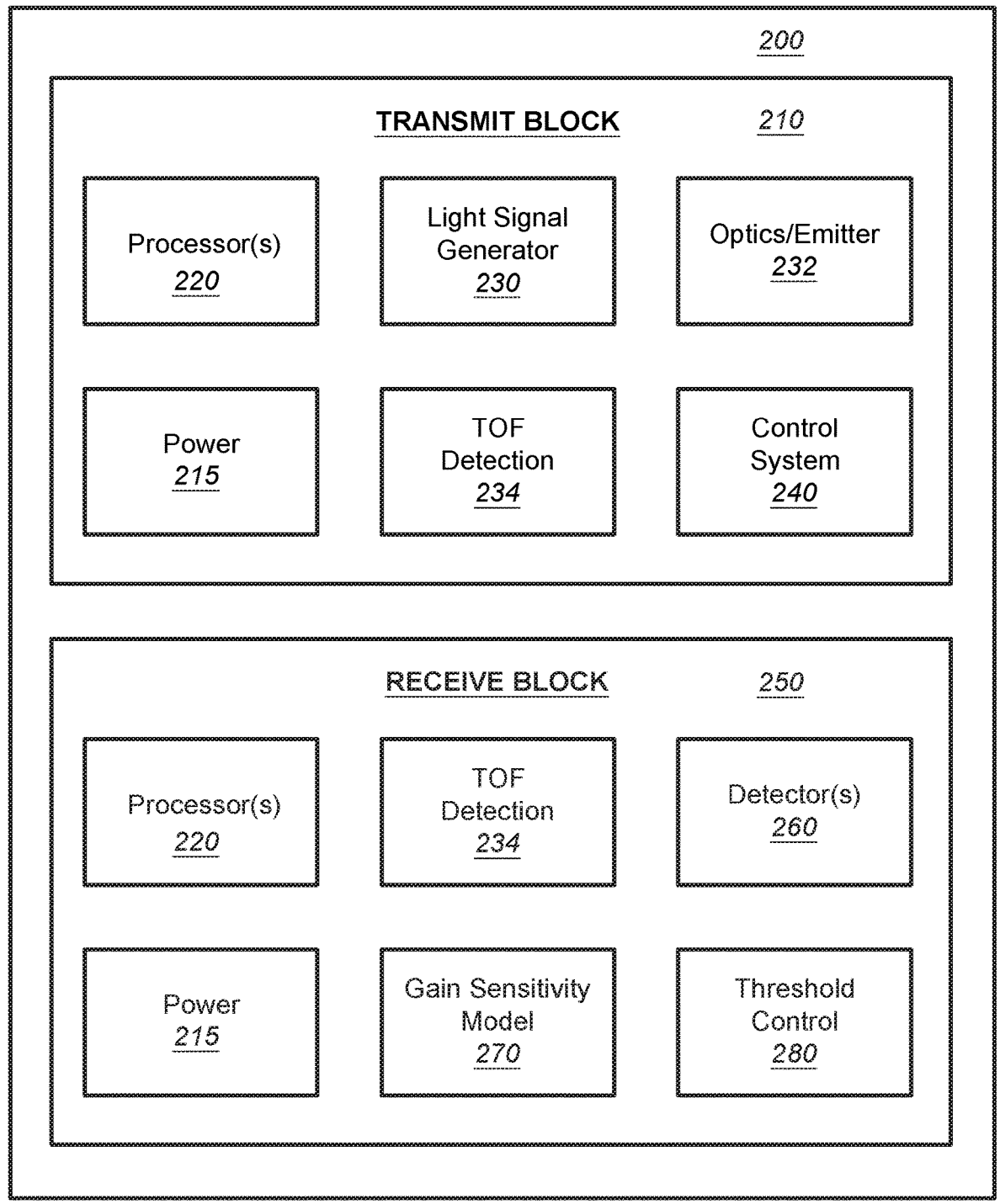
FIG. 2 shows aspects of a LiDAR-based detection system, according to certain embodiments.

FIG. 2 a simplified block diagram showing aspects of a LiDAR-based detection system 200, according to certain embodiments. System 200 may be configured to transmit, detect, and process LiDAR signals to perform object detection as described above. In general, a LiDAR system 200 includes one or more transmitters (e.g., transmit block 210) and one or more receivers (e.g., receive block 250). LiDAR system 200 may further include additional systems that are not shown or described to prevent obfuscation of the novel features described herein. In some embodiments, some or all aspects of LiDAR system 200 may be incorporated into any of the embodiments described herein, including but limited to the embodiments shown and described with respect to FIGS. 3-8 (e.g., Systems 300, 700).

Transmit block 210, as described above, can incorporate a number of systems that facilitate that generation and emission of a light signal, including dispersion patterns (e.g., 360 degree planar detection), pulse shaping and frequency control, TOF measurements, and any other control systems to enable the LiDAR system to emit pulses in the manner described above. In the simplified representation of FIG. 2, transmit block 210 can include processor(s) 220, light signal generator 230, optics/emitter module 232, power block 215, TOF module 234, and control system 240. Some of all of system blocks 220-240 can be in electrical communication with processor(s) 220. In some cases, LiDAR module 102 (of FIG. 1) may incorporate some or all of system 200 including transmit block 210, receive block 250, other LiDAR systems, or any combination thereof.

In certain embodiments, processor(s) 220 may include one or more microprocessors (μCs) and can be configured to control the operation of system 200. Alternatively or additionally, processor 220 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, μCs, DSPs, ASIC, programmable logic device, and the like, may be configured in other system blocks of system 200. For example, control system block 240 may include a local processor to certain control parameters (e.g., operation of the emitter). Processor(s) 220 may control some or all aspects of transmit block 210 (e.g., TOF module 234, optics/emitter 232, control system 240, etc.), receive block 250 (e.g., processor(s) 220) or any aspects of LiDAR system 200. In some embodiments, multiple processors may enable increased performance characteristics in system 200 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Light signal generator 230 may include circuitry (e.g., a laser diode) configured to generate a light signal, which can be used as the LiDAR send signal, according to certain embodiments. In some cases, light signal generator 230 may generate a laser that is used to generate a continuous or pulsed laser beam at any suitable electromagnetic wavelengths spanning the visible light spectrum and non-visible light spectrum (e.g., ultraviolet and infra-red). In some embodiments, lasers are commonly in the range of 600-1200 nm, although other wavelengths are possible, as would be appreciated by one of ordinary skill in the art.

Optics/Emitter block 232 (also referred to as transmitter 232) may include one or more arrays of mirrors for redirecting and/or aiming the emitted laser pulse, mechanical structures to control spinning and/or moving of the emitter system, or other system to affect the system field-of-view, as would be appreciated by one of ordinary skill in the art with the benefit of this disclosure. For instance, some systems may incorporate a beam expander (e.g., convex lens system) in the emitter block that can help reduce beam divergence and increase the beam diameter. These improved performance characteristics may mitigate background return scatter that may add noise to the return signal. In some cases, optics/emitter block 232 may include a beam splitter to divert and sample a portion of the pulsed signal. For instance, the sampled signal may be used to initiate the TOF clock. In some cases, the sample can be used as a reference to compare with backscatter signals. Some embodiments may employ micro electromechanical mirrors (MEMS) that can reorient light to a target field. Alternatively or additionally, multi-phased arrays of lasers may be used. Any suitable system may be used to emit the LiDAR send pulses, as would be appreciated by one of ordinary skill in the art.

Power block 215 can be configured to generate power for transmit block 210, receive block 250, as well as manage power distribution, charging, power efficiency, and the like. In some embodiments, power management block 215 can include a battery (not shown), and a power grid within system 200 to provide power to each subsystem (e.g., control system 240, etc.). The functions provided by power management block 215 may be subsumed by other elements within transmit block 210, or may provide power to any system in LiDAR system 200. Alternatively, some embodiments may not include a dedicated power block and power may be supplied by a number of individual sources that may be independent of one another.

TOF module 234 may include a counter for measuring the time-of-flight of a round trip for a send and return signal. In some cases, TOF module 234 may be subsumed by other modules in LiDAR system 200, such as control system 240, optics/emitter 232, or other entity. TOF modules 234 may implement return "windows" that limit a time that LiDAR system 200 looks for a particular pulse to be returned. For example, a return window may be limited to a maximum amount of time it would take a pulse to return from a maximum range location (e.g., 250 m). Some embodiments may incorporate a buffer time (e.g., maximum time plus 10%). TOF module 234 may operate independently or may be controlled by other system block, such as processor(s) 220, as described above. In some embodiments, transmit block may not include a TOF detection module, as the receive block 250 may perform this function. One of ordinary skill in the art with the benefit of this disclosure would appreciate the many modification, variations, and alternative ways of implementing the TOF detection block in system 200.

Control system 240 may control aspects of light signal generation (e.g., pulse shaping), optics/emitter control, TOF timing, or any other function described herein. In some cases, aspects of control system 240 may be subsumed by processor(s) 220, light signal generator 230, TOF 234, or any block within transmit block 210, or LiDAR system 200 in general.

Receive block 250 may include circuitry configured to detect a process a return light pulse to determine a distance of an object, and in some cases determine the dimensions of the object, the velocity and/or acceleration of the object, and the like. Processor(s) 265 may be configured to perform operations such as processing received return pulses from detectors(s) 260, controlling the operation of TOF module 234, controlling threshold control module 280, or any other aspect of the functions of receive block 250 or LiDAR system 200 in general.

Detector(s) 260 may detect incoming return signals that have reflected off of one or more objects. In some cases, LiDAR system 200 may employ spectral filtering based on wavelength, polarization, and/or range to help reduce interference, filter unwanted frequencies, or other deleterious signals that may be detected. Typically, detector(s) 260 can detect an intensity of light and records data about the return signal (e.g., via coherent detection, photon counting, analog signal detection, or the like). Detector (s) 260 can use any suitable photodetector technology including solid state photodetectors (e.g., silicon avalanche photodiodes, complimentary metal-oxide semiconductors (CMOS), charge-coupled devices (CCD), hybrid CMOS/CCD devices) or photomultipliers. In some cases, a single receiver may be used (see, e.g., FIG. 3) or multiple receivers may be configured to operate in parallel (see, e.g., FIG. 7).

Gain sensitivity model 270 may include systems and/or algorithms for determining a gain sensitivity profile that can be adapted to a particular object detection threshold. The gain sensitivity profile can be modified based on a distance (range value) of a detected object (e.g., based on TOF measurements). In some cases, the gain profile may cause an object detection threshold to change at a rate that is inversely proportional with respect to a magnitude of the object range value. A gain sensitivity profile may be generated by hardware/software/firmware, or gain sensor model 270 may employ one or more look up tables (e.g., stored in a local or remote database) that can associate a gain value with a particular detected distance or associate an appropriate mathematical relationship there between (e.g., apply a particular gain at a detected object distance that is 10% of a maximum range of the LiDAR system, apply a different gain at 15% of the maximum range, etc.). In some cases, a Lambertian model may be used to apply a gain sensitivity profile to an object detection threshold, as shown and described below with respect to FIG. 4. The Lambertian model typically represents perfectly diffuse (matte) surfaces by a constant bidirectional reflectance distribution function (BRDF), which provides reliable results in LiDAR system as described herein. However, any suitable gain sensitivity profile can be used including, but not limited to, Oren-Nayar model, Nanrahan-Krueger, Cook-Torrence, Diffuse BRDF, Limmel-Seeliger, Blinn-Phong, Ward model, HTSG model, Fitted Lafortune Model, or the like. One of ordinary skill in the art with the benefit of this disclosure would understand the many alternatives, modifications, and applications thereof.

Threshold control block 280 may set an object detection threshold for LiDAR system 200. For example, threshold control block 280 may set an object detection threshold over a certain a full range of detection for LiDAR system 200. The object detection threshold may be determined based on a number of factors including, but not limited to, noise data (e.g., detected by one or more microphones) corresponding to an ambient noise level, and false positive data (typically a constant value) corresponding to a rate of false positive object detection occurrences for the LiDAR system. In some embodiments, the object detection threshold may be applied to the maximum range (furthest detectable distance) with the object detection threshold for distances ranging from the minimum detection range up to the maximum range being modified by a gain sensitivity model (e.g., Lambertian model), as described below with respect to FIG. 4.

Although certain systems may not expressly discussed, they should be considered as part of system 200, as would be understood by one of ordinary skill in the art. For example, system 200 may include a bus system (e.g., CAMBUS) to transfer power and/or data to and from the different systems therein. In some embodiments, system 200 may include a storage subsystem (not shown). A storage subsystem can store one or more software programs to be executed by processors (e.g., in processor(s) 220). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein. Some software controlled aspects of LiDAR system 200 may include aspects of gain sensitivity model 270, threshold control 280, control system 240, TOF module 234, or any other aspect of LiDAR system 200.

It should be appreciated that system 200 is meant to be illustrative and that many variations and modifications are possible, as would be appreciated by one of ordinary skill in the art. System 200 can include other functions or capabilities that are not specifically described here. For example, LiDAR system 200 may include a communications block (not shown) configured to enable communication between LiDAR system 200 and other systems of the vehicle or remote resource (e.g., remote servers), etc., according to certain embodiments. In such cases, the communications block can be configured to provide wireless connectivity in any suitable communication protocol (e.g., radio-frequency (RF), Bluetooth, BLE, infra-red (IR), ZigBee, Z-Wave, Wi-Fi, or a combination thereof).

While system 200 is described with reference to particular blocks (e.g., threshold control block 280), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 200 may be combined with or operated by other sub-systems as informed by design. For example, power management block 215 and/or threshold control block 280 may be integrated with processor(s) 220 instead of functioning as separate entities.

Figure 3:
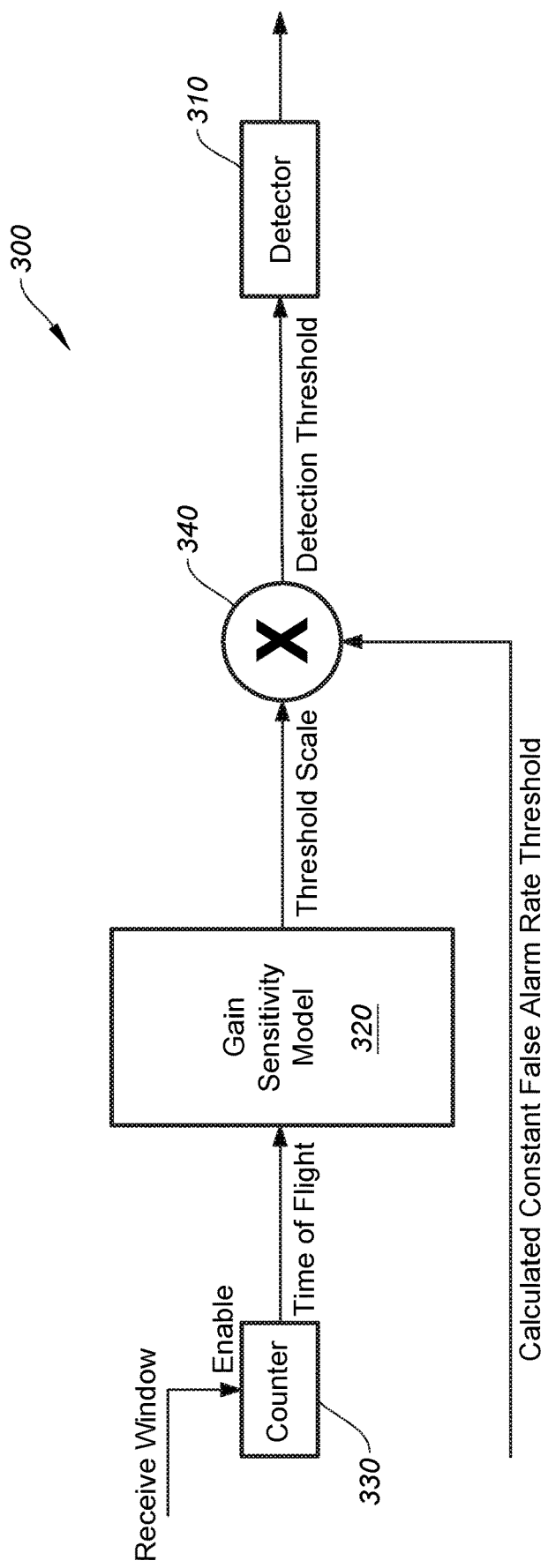
FIG. 3 shows a receiver module for a LiDAR system using a serial dynamic threshold system topology, according to certain embodiments.

FIG. 3 shows a receiver module 300 for a LiDAR system using a serial dynamic threshold system topology, according to certain embodiments. Receiver module 300 can include a detector(s) 310, counter 330, gain sensitivity model 320, and threshold control 340. For an operational overview, a dynamic range dependent threshold LiDAR detection scheme is presented to reduce the impact of false alarms (false-positive objection detections) at close (e.g., 20 m) to mid-range (e.g., 60 m) distances, without having to sacrifice detection sensitivity at far ranges (e.g., 150 m). System 300 can compute a threshold based on the surrounding noise environment and a given constant false alarm rate (CFAR). This threshold may be applied to detect the farthest object in the system requirement. A gain sensitivity model (e.g., Lambertian model) can then be used to calculate a gain to be applied on the threshold over the range of operation (e.g., the maximum range minus the minimum range). A counter (e.g., TOF module 230) may then be used during a receive window to estimate the detection range based on the determined time-of-flight and the object detection threshold can be adjusted accordingly. As the detection range increases, the threshold decreases (per the gain profile) until the maximum detection range is reached.

Referring back to FIG. 3, after a send signal is sent (e.g., pulsed laser), counter 330 begins tracking the TOF of the signal, which includes the round trip time of the pulse from emission to reflection and capture. Counter 330 may receive a receive window, which may provide an expected time to receive a return pulse. For example, if a maximum range of detection is known (e.g., 200 m), then a receive window may be applied that will only look for a return signal during the time it should take for a signal to be emitted, reflect off of an object at 200 m, and return. Setting a receive window may help reduce false positive readings by rejecting signals received outside the window, which could be spurious signals or return beyond the range of detection (signals that may have unacceptably low SNRs and amplitudes at or below the noise floor). In some embodiments, a buffer may be used that extends the window beyond the normal range of detection (e.g. 10% beyond maximum range of system). Counter 330 may calculate a TOF of the return signal (based on the emitting of sending the send signal and detecting the return signal) and feed it to gain sensitivity model 320, which may amplify and scale the object detection threshold for the given detected distance based on a gain sensitivity profile (e.g., Lambertian model), as described above and shown in FIG. 4. Threshold control 340 may receive the scaled object detection threshold (modified by gain sensitivity model 320) and further modify it based on a calculated constant false alarm rate threshold. In some instances, receiver systems may be subject to performance tradeoffs when balancing detector sensitivity versus the number of false alarms (e.g., false detections). In some cases, the number of false alarms can be set to a desired value (e.g., number of false alarms allowed in a given time frame, over a range or subset thereof, or a combination thereof), and the threshold can be calculated based on that determined false alarm number. This consideration can provide a reliable threshold value that has a high sensitivity with a controlled false alarm rate. In some embodiments, the false alarm rate can be calculated by Equation 2, where the Pfa is the probability of a false alarm and the noise power can be calculated as shown in Equation 3, and typical values for the noise voltage would be understood by those of ordinary skill in the art. The Q-function can be a tail distribution function of the standard normal distribution. For instance, Q(x) can be the probability that a normal (e.g., Gaussian) random variable will obtain a value larger than x standard deviations, as would be appreciated by one of ordinary skill in the art with the benefit of this disclosure.

$$CFAR = Q(Pfa) * SNR * \text{noise\_power} \quad \text{(Equation 2)}$$

$$\text{Noise\_power} = (\text{average of noise\_voltage})^2 \quad \text{(Equation 3)}$$

Threshold control 340 may modify the object detection threshold for detector 310 based on the scaled threshold from the gain sensitivity model and the false alarm rate threshold. Thus, a novel LiDAR detection system is presented that can dynamically adjust an object detection threshold for a single detector by modifying a gain applied to an object detection threshold based on a distance of the detected object, as well as ambient noise and false positive rates. This can be advantageous as close to mid-range signals may have high amplitudes with respect to the noise floor (high SNR), so the object detection threshold can be set well above the noise floor to greatly reduce the chance of false detection due to spurious noise signals, while still having an object detection threshold low enough that legitimate return signals will be detected with high reliability. Conversely, objects near the maximum limits of detection may have lower amplification applied the object detection threshold (e.g., approaching unity gain) as return signal amplitudes may be relatively low at that distance and, as indicated above, the system can already be calibrated such that the non-amplified object detection threshold is already optimized for the maximum range, as described above. In some embodiments, a feedback system may be employed that uses a TOF to detect object distances and uses the detected distance to then modify subsequent measurements of the detected object using receiver module 300.

Figure 4:
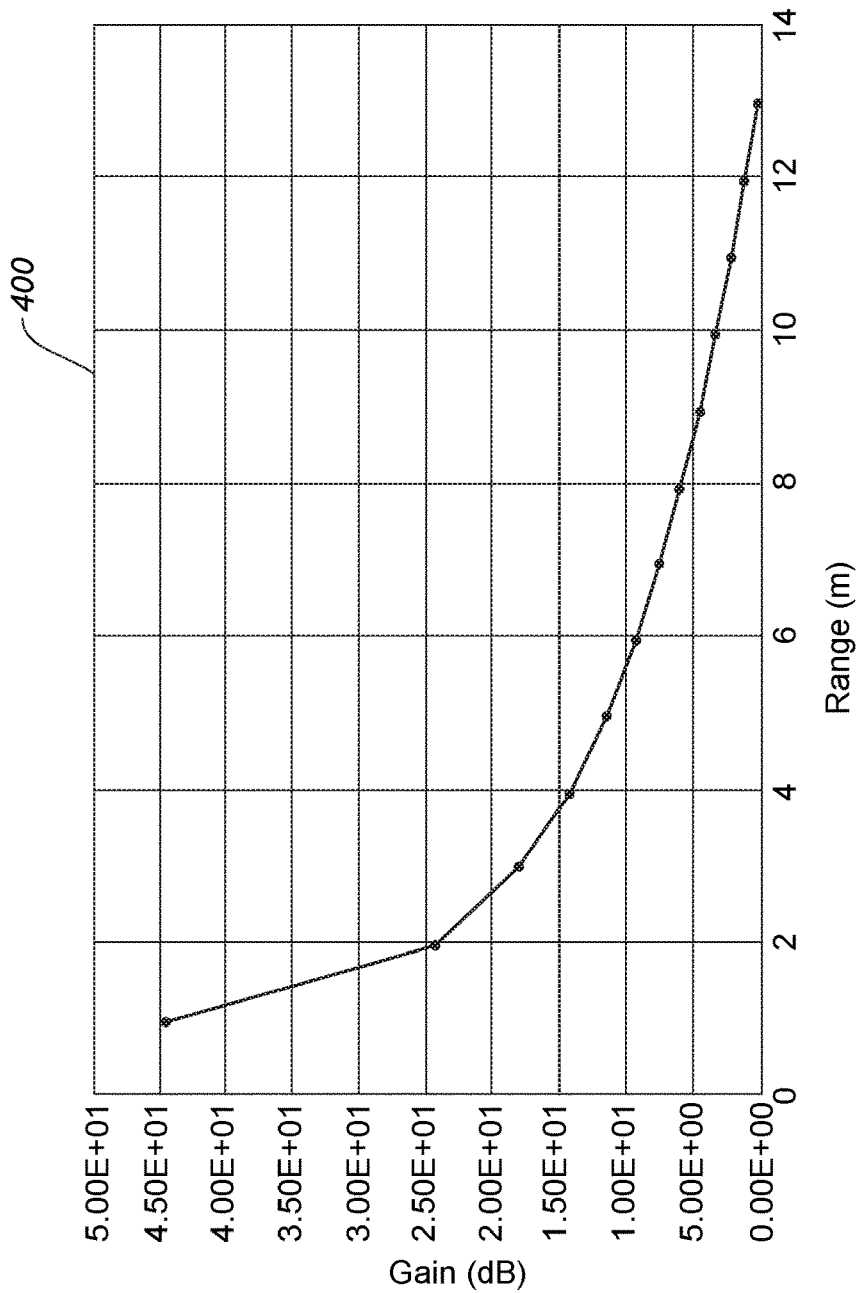
FIG. 4 shows a graph plotting a gain factor versus a range in a LiDAR-based detection system, according to certain embodiments.

FIG. 4 shows a graph 400 plotting a gain factor versus a range in a LiDAR-based detection system, according to certain embodiments. For the purpose of explanation, it will be assumed that graph 400 corresponds to gain sensitivity model 320 of FIG. 3. Graph 400 depicts a gain sensitivity profile as applied to an object detection threshold over a range of detection (e.g., 1-120 m). As described above with respect to FIG. 3, an object detection threshold may be calculated for the longest range based on an ambient noise level and/or false positive (false alarm) rate. Referring to graph 400, at the maximum range of detection (e.g., 120-130 m), there is approximately a unity gain (0 dB). In some cases, return signals received from object at this range may have a very low amplitude (e.g., 0.01 V to the input of the analog-to-digital converter) and poor SNR, thus amplifying (i.e., increasing) the object detection threshold may prevent return signal from long ranges from triggering the threshold. Thus, preferred embodiments may typically have a very low gain (e.g., unity gain) applied to the object detection threshold at or near the maximum range of detection. As the range moves from the maximum to the minimum range of detection, the gain as applied to the object detection threshold may increase according to a gain sensitivity profile. In some cases, a Lambertian model may be used, as shown in FIG. 4. At the minimum range of detection (e.g., 1 m), a gain of approximately 45 dB is applied, and the object detection threshold is increased accordingly. Higher object detection threshold at closer ranges can be appropriate as close to mid-range signals can be higher in amplitude (e.g., 6 dB-44 dB higher than the noise floor) with high SNRs and higher reliability of detection. In some cases, the Lambertian model can provide a gain sensitivity value that proportionally tracks how a send/return signal may weaken and/or degrade at further distances from the LiDAR system and provides an optimal gain for the object detection threshold at any point within the range, as would be appreciated by one of ordinary skill in the art with the benefit of this disclosure.

Although FIG. 4 depicts a gain sensitivity profile following a Lambertian model profile, any suitable gain sensitivity profile can be used including, but not limited to, Oren-Nayar model, Nanrahan-Krueger, Cook-Torrence, Diffuse BRDF, Limmel-Seeliger, Phong, Blinn-Phong, Ward model, HTSG model, Fitted Lafortune Model, or the like. One of ordinary skill in the art with the benefit of this disclosure would understand the many alternatives, modifications, and applications thereof. In some cases, the gain sensitivity profile may be generated by logic, accessed via lookup table that is stored locally (memory subsystem 908) or remotely (e.g., remote server), or from other resource or entity, as would be appreciated by one of ordinary skill in the art with the benefit of this disclosure.

Figure 5:
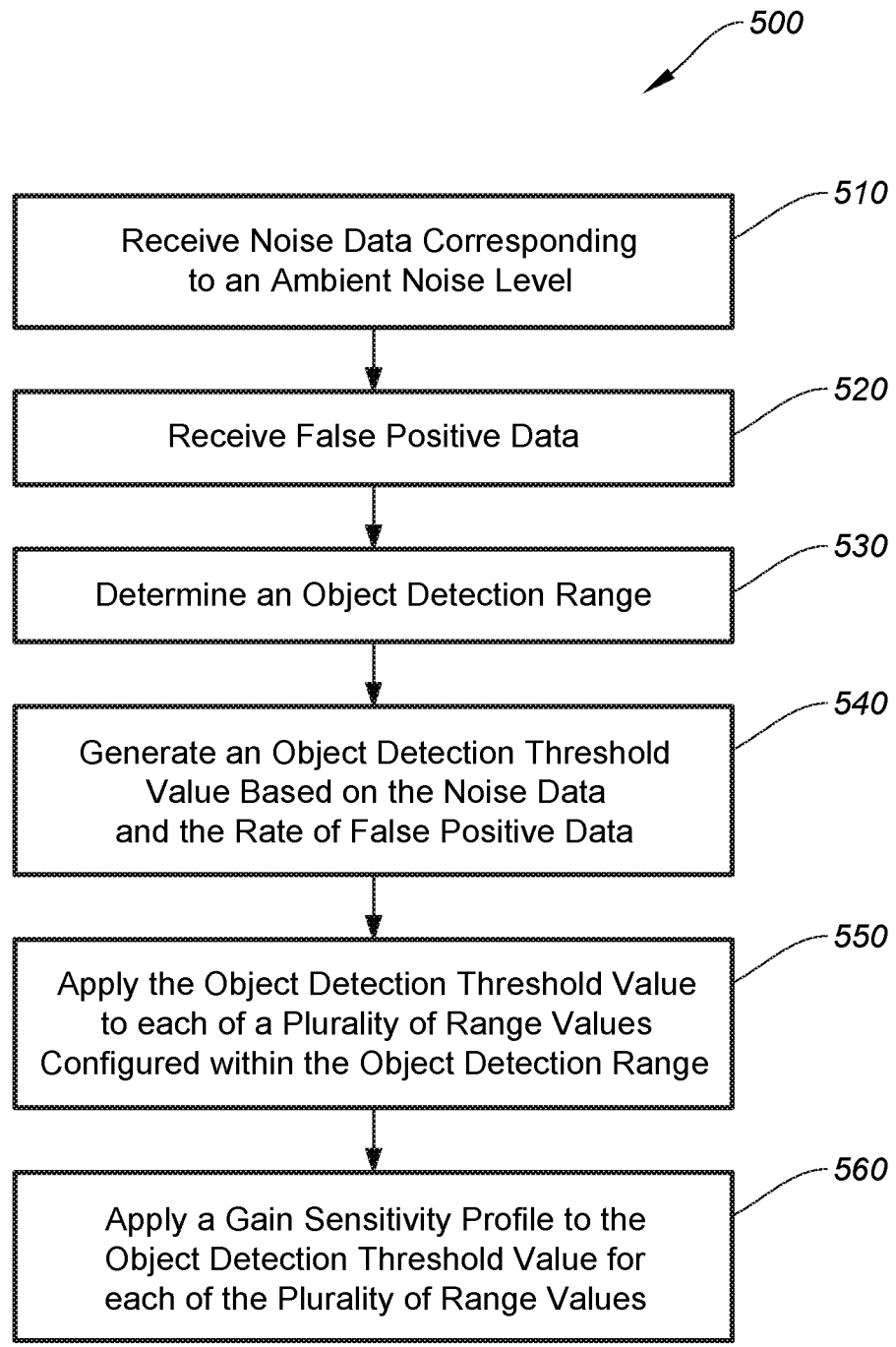
FIG. 5 is a simplified flow chart showing a method for modifying an object detection threshold value across a range using a gain sensitivity profile, according to certain embodiments.

FIG. 5 is a simplified flow chart showing a method 500 for modifying an object detection threshold value across a range using a gain sensitivity profile, according to certain embodiments. Method 500 may be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 500 can be performed by system 200 of FIG. 2 and/or aspects of the serial dynamic threshold system 300 of FIG. 3.

At operation 510, method 500 can include receiving noise data corresponding to an ambient noise level, according to certain embodiments. For example, the noise data may collected by an audio detection system (e.g., microphone array controlled by processor(s) 220) that detects ambient noise level adjacent to the vehicle. The ambient noise level may vary widely in different vehicle environments. For instance, sudden changes in weather, rapidly changing lighting conditions (e.g., entering a tunnel on a sunny day), headlight interference during low light conditions, and the like and cause changes to the ambient noise level.

At operation 520, method 500 can include receiving false positive data corresponding to a rate of false positive object detection occurrences for the LiDAR system, according to certain embodiments. In some cases, the false positive data may be received from a look up table (e.g., stored in storage subsystem 906), from manual user entry or automated entry (e.g., based on historical data). In some cases, false alarm data may be iteratively updated as the expected false alarm rate is continuously or periodically compared to an actual false alarm rate. For example, in some embodiments a lowest threshold level can be calculated based on a desired false alarm rate (e.g., based on historical data, estimations, etc.) and the threshold, maximum range, and/or false alarm rate can be modified based on how the actual results correlate with the expected results, as would be appreciated by one of ordinary skill in the art with the benefit of this disclosure. Although method 500 includes receiving the false positive data, some implementations may already have an associated false alarm rate associated with the particular range, and thus operation 520 may not be performed.

At operation 530, method 500 can include determining an object detection range spanning a distance defined by a minimum range of object detection and a maximum range of object detection for the LiDAR system, according to certain embodiments. For example, a minimum range may be 1 m from the LiDAR emitter (also referred to as LiDAR transmitter), and maximum range may extend as far as 200 m or more, depending on the LiDAR system. Other ranges are possible. In some cases, LiDAR systems may be optimized for particular ranges (e.g., 50 m-100 m) as other detection systems may be applied for closer (e.g., 1-50 m) or farther objects (e.g., >100 m), such as RADAR, video, ultrasound, IR, or the like.

At operation 540, method 500 can include generating an object detection threshold value for detecting objects based on the noise data and the rate of false positive data. The object detection threshold value can define a signal amplitude minimum value for any received LiDAR return signal that causes the LiDAR system to determine that an object is detected, according to certain embodiments. For example, the LiDAR system may detect return signals with amplitudes at or above the object detection threshold value and ignore detected return signals with amplitudes below the object detection threshold value.

At operation 550, method 500 can include applying the object detection threshold value to each of a plurality of range values within the object detection range, according to certain embodiments. Any suitable number of range values may be configured within the object detection range. For example, some embodiments may have range values increment in whole numbers (e.g., 1 m, 2 m, 3 m, . . . ), in multiples (e.g., 10 m, 20 m, 30 m, . . . ; 0.5 m, 1.0 m, 1.5 m, 2.0 m, . . . ), or any suitable number of values and in any suitable numerical progression.

At operation 560, method 500 can include applying a gain sensitivity profile to the object detection threshold value at each of a plurality of range values. The gain applied to the object detection threshold can be configured to decrease from a maximum gain value (e.g., 44 dB per FIG. 4) at the minimum range of object detection (e.g., 1 m) to a minimum gain value (e.g., 0 dB) at the maximum range of object detection (e.g., 130 m), according to certain embodiments. In some embodiments, the gain sensitivity profile may follow a Lambertian model or other suitable model, as described above. In some cases, the minimum gain value may be a multiplier of 1 (0 dB—unity gain) and the gain sensitivity value may change in an inversely proportional manner with respect to a magnitude of the object range value. Thus, the amplification of the object detection threshold can decrease as the range is increased, as shown, e.g., in FIG. 4.

It should be appreciated that the specific steps illustrated in FIG. 5 provide a particular method 500 for modifying an object detection threshold value across a range using a gain sensitivity profile, according to certain embodiments. Other sequences of steps may also be performed according to alternative embodiments. Furthermore, additional steps may be added or removed depending on the particular applications. For instance, operation 520 may be omitted from the method, as described above. Any combination of changes can be used and one of ordinary skill in the art with the benefit of this disclosure would understand the many variations, modifications, and alternative embodiments thereof.

Figure 6:
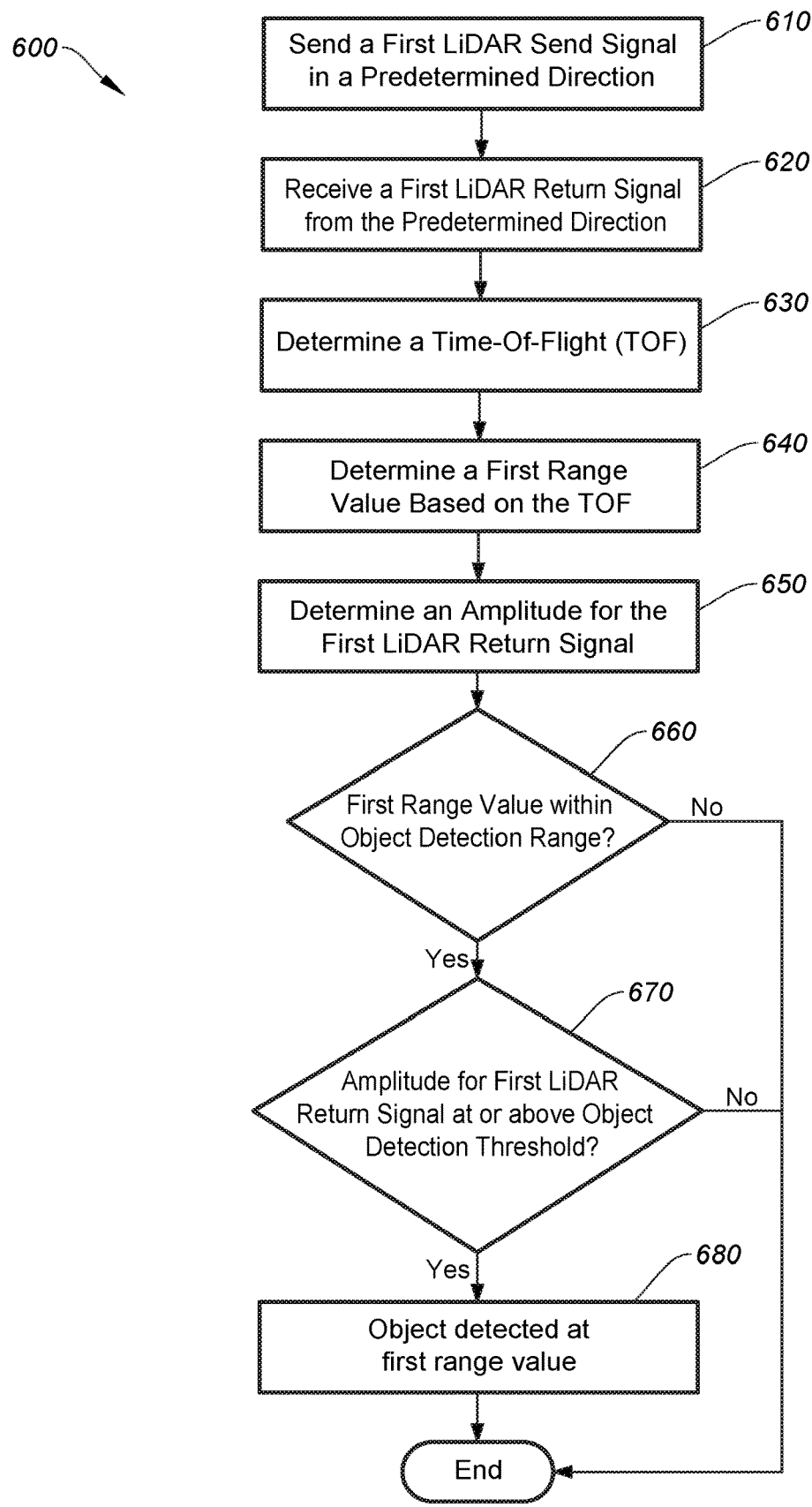
FIG. 6 shows a simplified flow chart showing a method for detecting an object over a range using a LiDAR-based detection system, according to certain embodiments.

FIG. 6 is a simplified flow chart showing a method 600 for detecting an object over a range using a LiDAR-based detection system, according to certain embodiments. Method 600 may be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 500 can be performed by system 200 of FIG. 2 or portions thereof, and/or aspects of the serial dynamic threshold system 300 of FIG. 3.

At operation 610, method 600 can include sending a first LiDAR send signal in a predetermined direction, according to certain embodiments. For example, light signal generator 230 may generate a laser pulse (e.g., 5 ns duration) and optics/emitter block 232 may emit the pulse in a predetermined direction (e.g., within a 360 degree planar FOV).

At operation 620, method 600 can include receiving a first LiDAR return signal from the predetermined direction, the first LiDAR return signal being a reflection of the first LiDAR send signal that has been reflected by an object, according to certain embodiments. In some cases, the first LiDAR return signal may have a smaller amplitude as the signal may be subject to signal degradation, signal scattering (e.g., a portion is reflected), signal interference from other electromagnetic radiation, or other deleterious effects, as would be appreciated by one of ordinary skill in the art with the benefit of this disclosure.

At operation 630, method 600 can include determining a TOF measurement corresponding to a difference between a time that the first LiDAR send signal was sent and the first LiDAR return signal was received, according to certain embodiments. For example, counter 330 of TOF detection module 234) may count the round trip of the first LiDAR signal from emission, reflection, and detection. In some cases, counter 330 may be enabled via a receive window that can set time boundaries of when a return signal is expected to arrive, which may typically be set to a time range that encapsulates an amount of time for detection at the maximum range. By way of example, method 600 may include starting a counter for a receive window when the first LiDAR send signal is sent and stopping the counter for the receive window then the first LiDAR return signal is received, where the difference between the time that the first LiDAR send signal was sent and the first LiDAR return signal was received corresponds to a difference between a time when the counter is started and stopped. By way of example, consider again that the TOF is the time different between the reference pulse being transmitted (and/or detected) and the returned pulse being detected. In some systems, close range may be considered about 0-30 m (e.g., TOF value of about 0-200 ns), mid-range may be about 30 m-80 m (e.g., TOF value from about 200 ns-533 ns), and long range from about 80 m to 120 m (e.g., TOF value form about 533 ns to 800 ns). One of ordinary skill in the art with the benefit of this disclosure would understand that different overall ranges, different individual ranges, additional range definitions (e.g., close/mid-range, very far range, etc.), and the like are possible.

At operation 640, method 600 can include determining a first range value based on the TOF measurement, the first range value defining a distance of the object from the vehicle, according to certain embodiments. For example, at about 30 m, the TOF may be approximately 200 ns, although other measurements are possible due to a variety of influencing conditions including weather, interference, system calibration/accuracy, etc.

At operation 650, method 600 can include determining an amplitude for the first LiDAR return signal, according to certain embodiments. The LiDAR return signal may be detected by, e.g., detector 310 of FIG. 3. As indicated above, the received signal may have a lower amplitude than the send signal due to scattering, interference, and the like.

At operation 660, method 600 can include determining whether the first range value is within the object detection range. For example, a detected range of 60 m (the range that the detected object is located) is within the object detection range of 1 m-200 m. If the first range value is not within the object detection range (e.g., first range value of 250 m), the method ends. In some cases, the detection process restarts at operation 610 (not shown). If the first range value is within the object detection, method 600 proceeds to operation 670. In some cases, determining whether the first range value is within the object detection range may also be based on whether the detected return pulse was received within a corresponding receive window.

At operation 680, method 600 can include determining that the object that an object is detected when both the first range value is within the object detection range and the amplitude for the first LiDAR return signal is at or above an object detection threshold value applied to the first range value (operation 670), the object detection threshold value at the first range value being modified by the gain sensitivity profile. For example, referring to FIG. 4, the object detection threshold may be modified by a gain of approximately 14.1 dB at 40 m.

Method 600 may further include determining that an object is not detected when the first range value is not within the object detection range, as indicated above, or the amplitude for the first LiDAR return signal is not at or above the object detection threshold value applied to the first range value.

It should be appreciated that the specific steps illustrated in FIG. 6 provide a particular method 600 for controlling access to a vehicle compartment and/or vehicle component, according to certain embodiments. Other sequences of steps may also be performed according to alternative embodiments. That is, some embodiments may perform method 600 in a different order. For instance, some embodiments may similarly perform operations 610 (i.e., send first LiDAR send signal in a predetermined direction) and 620 (i.e., receive first LiDAR return signal form predetermined direction) in order, but may then deviate from the method as shown in FIG. 6. By way of example, some embodiments may follow operation 620 with operations 660-680, followed by operations 630-650 to complete the operations. For instance, a first range value may be determined to be within an object detection range if it is received within the receive window. Furthermore, additional steps may be added or removed depending on the particular applications. Any combination of changes can be used and one of ordinary skill in the art with the benefit of this disclosure would understand the many variations, modifications, and alternative embodiments thereof.

FIG. 7 shows a LiDAR system receiver module 700 with parallel detectors 710(0-n), according to certain embodiments. To provide a high level overview, the architecture of receiver module 700 can include two or more parallel detectors, each with a different threshold, followed by an arbitration logic 720. The system may compute a far range object detection threshold based on the surrounding noise environment and a given constant false alarm rate. This threshold may be applied to detect the farthest object in the system requirement. A gain sensitivity profile (e.g., Lambertian model) may be used to calculate thresholds for the other detectors based on a given detection range, similar to the methods described above with respect to FIGS. 3-4. Each detector may store the detected pulses within an active window and may rely on the arbitration logic to pass on desired pulses. The arbitration logic can sequentially poll the detectors from the detector with the highest assigned threshold to the detector with the lowest assigned threshold using an arbitration logic as further described below.

In certain particular embodiments, a LiDAR system may include one or more processors (e.g., processors 220) and a transmitter (e.g., transmit block 210) controlled by the one or more processors. In some cases, the transmitter may be configured to generate a pulsed beam of light having M pulses (e.g., 10 pulses). They system can include N receivers (e.g., receivers 0-N—typically 3 or more receivers in certain embodiments) including a first receiver 0 controlled by the one or more processors, where the first receiver configured to detect and store return pulses that comprise portions of the pulsed beam of light that has been reflected off of one or more objects. In this case, the term "receiver" generally refers to detectors and their corresponding support circuitry (e.g., unless expressly described as "receive block," which may refer to a whole receiver section, such as receive lock 250 of FIG. 2.

Referring back to FIG. 7, the system can further include a second receiver 1 controlled by the one or more processors, the second receiver configured to detect and store the return pulses and any number of additional receivers (here, up to the Nth receiver) controlled by the one or more processors, the Nth receiver configured to detect and store return pulses, wherein each of the receivers are assigned an object detection threshold value defining a signal amplitude minimum value for the detected and stored return pulses that causes the LiDAR system to determine that an object is detected. The object detection threshold value for each of the receivers can be modified by a gain sensitivity profile configured to amplify the object detection threshold value based on a detected TOF of the detected and stored return pulses. In some cases, an arbitration logic module controlled by the one or more processors can be configured to consecutively retrieve the stored return pulses from the receivers that meet or exceed their corresponding object detection threshold value starting with the first receiver through the Nth receiver until the number of retrieved return pulses equals M pulses, which the system then validates the retrieved return pulses as a detected object. In some cases, object detection threshold value can be determined based on an ambient noise level adjacent to the vehicle and a rate of false positive object detection occurrences for the LiDAR system, as described above with respect to FIG. 3. A magnitude of amplification provided by the gain sensitivity profile for each receiver can be inversely proportional to a magnitude of the corresponding detected TOF of the detected and stored return pulses. That is, receivers (detectors) designated to detect objects at close range (e.g., less than 20 m) may have higher object detection thresholds (amplified by the gain sensitivity profile) than receivers designated to detect objects at a far range (e.g., 100 m or more), described above with respect to FIGS. 2-4. In some cases, the gain sensitivity profile corresponds to a Lambertian model. The arbitration logic 720 (e.g. controlled by processors 220, stored in memory 910, etc.) then analyzes each captured return signal to determine whether detected objects are validated (determined to be true), as further described with respect to FIG. 8. Explained another way, the first detector (detector 0) may have a threshold based on the constant false alarm rate at a particular farthest detected distance, and each subsequent detector has a modified threshold (e.g., CFAR×scale) that may be based on the Lambertian model or other scaling factor, as described above.

FIG. 8 shows a simplified flow chart showing a method for detecting one or more objects in a multi-receiver LiDAR-based system using an arbitration logic, according to certain embodiments. Method 800 may be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 800 can be performed by system 200 of FIG. 2 and/or receiver module 700 of FIG. 7.

At operation 810, method 800 can include transmitting M pulses from a LiDAR transmitter (e.g., via light signal generator 230 and optics/emitter 232). For example, M pulses may be 10 pulses sent in fast succession. In some cases, a single pulse may be sent with multiple return pulses (e.g., the pulse is returned by multiple objects at different distances from the vehicle.). Any number of pulses may be used, as would be appreciated by one of ordinary skill in the art with the benefit of this disclosure. At operation 820, receiver N is selected. In some cases, receiver (detector) N has the highest assigned object detection threshold value and is associated with a detection range closest to the vehicle (i.e., LiDAR system). In some cases, the object detection threshold at receiver N may be highest because the gain sensitivity profile amplifies the object detection threshold for receiver N higher than the other receivers. For the purpose of explanation, assume that receiver N is configured to detect objects at 10 m, receiver N-1 is configured to detect objects at 50 m, and receiver N-n is configured to detect objects at 100 m. At operation 830, all pulses $M_1$ stored at receiver N are detected. At operation 832, if the number of detected pulses $M_1$ that are stored at Receiver N are equal to the number of pulses M, then $M_1$ pulses are qualified (operation 834) as detected objects and the method ends. In other words, M pulses (e.g., 10 pulses) were transmitted as send signals and 10 pulses are expected as receive signals. In some cases, signals may scatter (split) and return as two pulses, typically at different reflection points (e.g., one signal returns at 10 m and a portion splits and moves past the 10 m object, ultimately reflecting off an object at 50 m). In such cases, at least M pulses are still being queried. In certain embodiments, a receive window can define how long a particular group of M pulses are searched for in each of the receivers. Thus, pulses received outside of the time defined by receive window may not be considered.

Referring back to method 800, if the number of detected pulses $M_1$ that are stored at receiver N are not equal to or greater than M (e.g., 4 pulses are detected), then method 800 continues to operation 836, where receiver module 700 determines whether any more receivers operate with the detection range. If not, the method returns to operation 810. For example, if 10 return pulses are expected and only five are received from all of the receivers with no more pulses detected during the remained of the receive window, this may be due to the remaining pulses being too weak to be detected by the system. In such cases, missing pulses may not be of significant concern as certain embodiments may prioritize the receiver with the highest detection threshold (e.g., typically one of the detected pulses), as these detections may correspond to objects that are closest to the vehicle and are typically of more immediate consequence and concern to the driver. If there are more receivers, then at operation 840 all pulses $M_2$ stored at receiver N-1 are detected. At operation 842, if the number of detected pulses $M_2$ that are stored at Receiver N plus the number of pulses $M_1$ stored at receiver N are equal to or greater than the number of pulses M, then $M_1+M_2$ pulses are qualified (operation 844) as detected objects and the method ends.

At operation 842, if the number of detected pulses $M_1+M_2$ that are stored at receivers N and N-1 are not equal to or greater than M (e.g., a total of 8 pulses are detected), then method 800 continues to operation 846, where receiver module 700 determines whether any more receivers operate with the detection range. If not, the method returns to operation 810. If there are more receivers, then at operation 850 all pulses $M_3$ stored at receiver N-n are detected. At operation 852, if the number of detected pulses $M_3$ that are stored at Receiver N plus the number of pulses $M_2$ and $M_1$ stored at receivers N and N-1 are equal to or greater than the number of pulses M, then $M_1+M_2+M_3$ pulses are qualified (operation 844) as detected objects and the method ends.

It should be appreciated that the specific steps illustrated in FIG. 8 provide a particular method 800 for controlling access to a vehicle compartment and/or vehicle component, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Exemplary Computer Systems Implementing Aspects of Embodiments Herein

Figure 9:
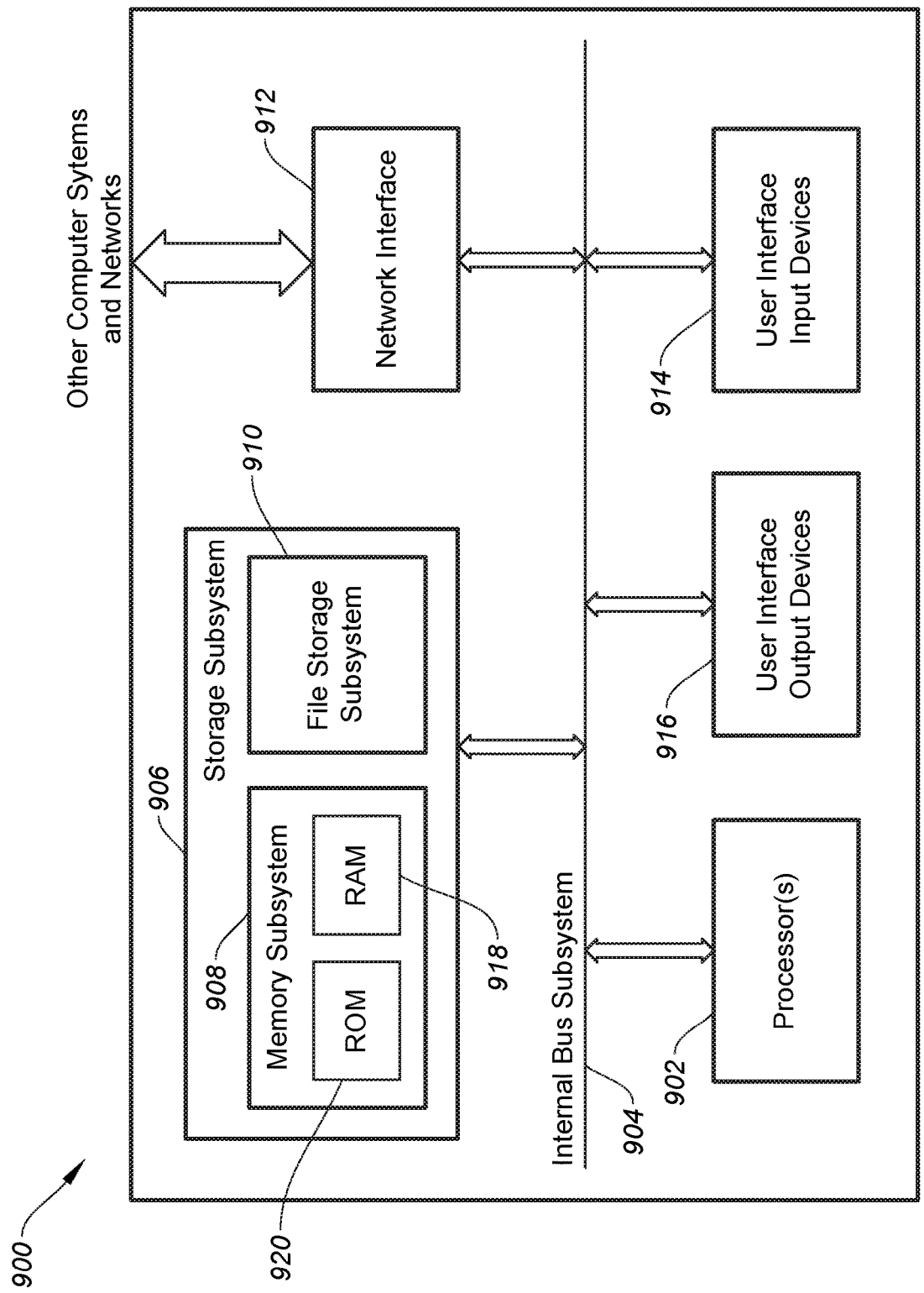
FIG. 9 shows a system for operating a LiDAR-based detection system, according to certain embodiments.

FIG. 9 is a simplified block diagram of computer system 900 configured to operate aspects of a LiDAR-based detection system, according to certain embodiments. Computer system 900 can be used to implement any of the systems and modules discussed above with respect to FIGS. 1-8. For example, computer system 900 may operate aspects of threshold control 280, TOF module 234, processor(s) 220, control system 240, or any other element of LiDAR system 200 or other system described herein. Computer system 900 can include one or more processors 902 that can communicate with a number of peripheral devices (e.g., input devices) via a bus subsystem 904. These peripheral devices can include storage subsystem 906 (comprising memory subsystem 908 and file storage subsystem 910), user interface input devices 914, user interface output devices 916, and a network interface subsystem 912.

In some examples, internal bus subsystem 904 (e.g., CAMBUS) can provide a mechanism for letting the various components and subsystems of computer system 900 communicate with each other as intended. Although internal bus subsystem 904 is shown schematically as a single bus, alternative embodiments of the bus subsystem can utilize multiple buses. Additionally, network interface subsystem 912 can serve as an interface for communicating data between computer system 900 and other computer systems or networks. Embodiments of network interface subsystem 912 can include wired interfaces (e.g., Ethernet, CAN, RS232, RS485, etc.) or wireless interfaces (e.g., ZigBee, Wi-Fi, cellular, etc.).

In some cases, user interface input devices 914 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 900. Additionally, user interface output devices 916 can include a display subsystem, a printer, or non-visual displays such as audio output devices, etc. The display subsystem can be any known type of display device. In general, use of the term "output device" is intended to include all possible types of devices and mechanisms for outputting information from computer system 900.

Storage subsystem 906 can include memory subsystem 908 and file/disk storage subsystem 910. Subsystems 908 and 910 represent non-transitory computer-readable storage media that can store program code and/or data that provide the functionality of embodiments of the present disclosure (e.g., software 91-204). In some embodiments, memory subsystem 908 can include a number of memories including main random access memory (RAM) 918 for storage of instructions and data during program execution and read-only memory (ROM) 920 in which fixed instructions may be stored. File storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and not intended to limit embodiments of the present disclosure. Many other configurations having more or fewer components than system 900 are possible.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local-area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A LiDAR system comprising:
   one or more processors;
   a transmitter controlled by the one or more processors, the transmitter configured to generate a pulsed beam of light having M pulses;
   a first receiver controlled by the one or more processors, the first receiver configured to detect and store return pulses that comprise portions of the pulsed beam of light that has been reflected off of one or more objects;
   a second receiver controlled by the one or more processors, the second receiver configured to detect and store the return pulses;
   an Nth receiver controlled by the one or more processors, the Nth receiver configured to detect and store the return pulses, the Nth receiver not including the first or second receiver;
   wherein each of the receivers are assigned an object detection threshold value defining a signal amplitude minimum value for the detected and stored return pulses that causes the LiDAR system to determine that an object is detected, and
   wherein the object detection threshold value for each of the receivers is modified by a gain sensitivity profile configured to amplify the object detection threshold value based on a detected TOF of the detected and stored return pulses; and
   an arbitration logic module controlled by the one or more processors, the arbitration logic module configured to:
     consecutively retrieve the stored return pulses from the receivers that meet or exceed their corresponding object detection threshold value starting with the first receiver through the Nth receiver until the number of retrieved return pulses equals M; and
     validate the retrieved M return pulses as detected objects.

2. The LiDAR system of claim 1 wherein the object detection threshold value is determined based on an ambient noise level adjacent to a vehicle that the LiDAR system is coupled to and a rate of false positive object detection occurrences for the LiDAR system.

3. The LiDAR system of claim 1 wherein a magnitude of amplification provided by the gain sensitivity profile for each receiver is inversely proportional to a magnitude of the corresponding detected TOF of the detected and stored return pulses.

4. The LiDAR system of claim 1 wherein the gain sensitivity profile corresponds to a Lambertian model.

5. The LiDAR system of claim 1 wherein the stored return pulses are pulses that were stored within a receive window.

6. The LiDAR system of claim 5 wherein the receive window is approximately equal to a TOF for a return signal at a maximum range of detection for the LiDAR system.

7. The LiDAR system of claim 1 wherein the arbitration logic module sequentially polls the receivers from a receiver with a highest assigned threshold to a receiver with a lowest assigned threshold.

8. A method for LiDAR detection comprising:
   generating a pulsed beam of light having M pulses;
   detecting and storing, by a first receiver, return pulses that comprise portions of the pulsed beam of light that has been reflected off of one or more objects;
   detecting and storing the return pulses by a second receiver;
   detecting and storing the return pulses by an Nth receiver, the Nth receiver not including the first or second receiver;
   assigning to each of the receivers an object detection threshold value defining a signal amplitude minimum value for the detected and stored return pulses that causes a determination that an object is detected, and
   modifying the object detection threshold value for each of the receivers by a gain sensitivity profile configured to amplify the object detection threshold value based on a detected TOF of the detected and stored return pulses; and
   consecutively retrieving the stored return pulses from the receivers that meet or exceed their corresponding object detection threshold value starting with the first receiver through the Nth receiver until the number of retrieved return pulses equals M; and
   validating the retrieved M return pulses as detected objects.

9. The method of claim 8 wherein the object detection threshold value is determined based on an ambient noise level adjacent to a vehicle and a rate of false positive object detection occurrences.

10. The method of claim 8 wherein a magnitude of amplification provided by the gain sensitivity profile for each receiver is inversely proportional to a magnitude of the corresponding detected TOF of the detected and stored return pulses.

11. The method of claim 8 wherein the gain sensitivity profile corresponds to a Lambertian model.

12. The method of claim 8 wherein the stored return pulses are pulses that were stored within a receive window.

13. The method of claim 12 wherein the receive window is approximately equal to a TOF for a return signal at a maximum range of detection.

14. The method of claim 8 wherein consecutively retrieving further comprises sequentially polling the receivers from a receiver with a highest assigned threshold to a receiver with a lowest assigned threshold.

* * * * *